US012429548B2

(12) United States Patent
Ren et al.

(10) Patent No.: US 12,429,548 B2
(45) Date of Patent: Sep. 30, 2025

(54) CROSS-LINK INTERFERENCE (CLI) MEASUREMENTS FOR RECEIVED SIGNAL STRENGTH INDICATOR (RSSI) BASED POSITIONING

(71) Applicant: QUALCOMM Incorporated, San Diego, CA (US)

(72) Inventors: Yuwei Ren, Beijing (CN); Weimin Duan, San Diego, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 422 days.

(21) Appl. No.: 18/015,705

(22) PCT Filed: Sep. 14, 2020

(86) PCT No.: PCT/CN2020/115044
§ 371 (c)(1),
(2) Date: Jan. 11, 2023

(87) PCT Pub. No.: WO2022/052101
PCT Pub. Date: Mar. 17, 2022

(65) Prior Publication Data
US 2023/0266424 A1    Aug. 24, 2023

(51) Int. Cl.
*G01S 5/02*     (2010.01)
*G01S 5/14*     (2006.01)
*H04W 24/10*   (2009.01)

(52) U.S. Cl.
CPC .......... *G01S 5/0215* (2013.01); *G01S 5/0284* (2013.01); *G01S 5/14* (2013.01); *H04W 24/10* (2013.01)

(58) Field of Classification Search
None
See application file for complete search history.

(56) References Cited

U.S. PATENT DOCUMENTS

2017/0303144 A1    10/2017   Guo et al.
2020/0228212 A1    7/2020    Xu et al.
(Continued)

FOREIGN PATENT DOCUMENTS

CN    110637494 A    12/2019
WO    2013181444 A2  12/2013
(Continued)

OTHER PUBLICATIONS

3GPP TS 38.215: "3rd Generation Partnership Project, Technical Specification Group Radio Access Network, NR, Physical Layer Measurements (Release 16)", V16.1.0 (Mar. 2020), pp. 1-22, Mar. 31, 2020 (Mar. 31, 2020) the whole document.
(Continued)

*Primary Examiner* — Adolf Dsouza
(74) *Attorney, Agent, or Firm* — Seyfarth Shaw LLP

(57) ABSTRACT

In a wireless communication system, cross-link interference (CLI) measurements are used for received signal strength indicator (RSSI) based positioning. A first user equipment (UE) receives from a base station, a first message comprising a cross-link interference (CLI) configuration; performs one or more CLI measurements associated with an uplink transmission of a second UE based on the CLI configuration; receives a second message comprising an uplink transmission power measurement of the second UE; determines a pathloss associated with the second UE based on the one or more CLI measurements and the uplink transmission power measurement; and determines a range between a location of the first UE and a location of the second UE based on the pathloss.

20 Claims, 16 Drawing Sheets

(56) References Cited

U.S. PATENT DOCUMENTS

| | | | |
|---|---|---|---|
| 2022/0103270 A1* | 3/2022 | Miao | H04L 5/0048 |
| 2022/0123847 A1* | 4/2022 | Ghozlan | H04B 17/318 |
| 2023/0413088 A1* | 12/2023 | Sedin | H04W 24/10 |
| 2024/0291623 A1* | 8/2024 | Pedersen | H04L 5/0048 |

FOREIGN PATENT DOCUMENTS

| | | | |
|---|---|---|---|
| WO | 2020123162 A1 | 6/2020 |
| WO | 2020145562 A1 | 7/2020 |
| WO | 2020146331 A1 | 7/2020 |

OTHER PUBLICATIONS

Huawei, et al., "Consideration on Cross-Link Interference in IAB", 3GPP TSG RAN WG1 Meeting #95, R1-1812203, 3rd Generation Partnership Project, Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 11, 2018, 10 Pages, XP051554075, Consideration on CLI measurement framework, p. 5, paragraph 3.1—p. 7, figures 8, 9 Consideration on CLI mitigation method, p. 7, paragraph 3.2—p. 8, Paragraph "3 Inter-IAB node CLI".

Huawei, et al., "Physical Layer Design for NR IAB", 3GPP TSG RAN WG1 Meeting #95, R1-1812198, 3rd Generation Partnership Project, Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 11, 2018, 15 Pages, Nov. 16, 2018, XP051554070, Backhaul link condition notification, p. 2. paragraph 2.2 IAB node timing alignment, p. 8, paragraph 4.2—p. 18 Cross-link interference and management, p. 9, paragraph 5—p. 12.

International Search Report and Written Opinion—PCT/CN2020/115044—ISA/EPO—Jun. 10, 2021.

ZTE et al., "Discussion on Measurement and RS Design for CLI Mitigation", 3GPP TSG RAN WG1 AH_NR#1 Meeting, R1-1700271, 3rd Generation Partnership Project, Mobile Competence Centre, 650, Route Des Lucioles, F-06921 Sophia-Antipolis Cedex, vol. RAN WG1, No. Spokane, Wa, Jan. 16, 2017-Jan. 20, 2017 Jan. 16, 2017, XP051207809, pp. 1-8, Section 3, Sections 3.2-3.3.

ZTE: "UE-to-UE Measurement As an Enabler for CLI Mitigation Schemes", 3GPP TSG RAN WG1 Meeting NR Ad-Hoc#2, R1-1710128, 3rd Generation Partnership Project (3GPP), Mobile Competence Centre, 650, Route Des Lucioles, F-06921, Sophia-Antipolis Cedex, France, vol. RAN WG1, No. Qingdao, Jun. 27, 2017-Jun. 30, 2017, Jun. 26, 2017, 9 Pages.

Intel Corporation: "Draft Reply LS on ProSe Coarse Proximity Estimation Based on Path Loss", 3GPP TSG RAN WG1 Meeting #82, R1-154583, Beijing, China, Aug. 24-28, 2015, 3rd Generation Partnership Project (3GPP), Mobile Competence Centre, 650, Route Des Lucioles, F-06921, Sophia-Antipolis Cedex, France, Aug. 23, 2015, pp. 1-6, XP051001845, Section 2-3.

Supplementary European Search Report—EP20952889—Search Authority—The Hague—May 8, 2024.

ZTE: "UE-to-UE Measurement As an Enabler for CLI Mitigation Schemes", 3GPP TSG RAN WG1 Meeting NR Ad-Hoc#2, R1-1710128, 3rd Generation Partnership Project (3GPP), Mobile Competence Centre, 650, Route Des Lucioles, F-06921 Sophia-Antipolis Cedex, France, vol. RAN WG1, No. Qingdao, Jun. 27, 2017-Jun. 30, 2017, Jun. 26, 2017, 9 Pages, XP051299352, Sec 2, p. 2, Sec 2.1.3, p. 3, Sec 2.2.4, p. 6, Sec 2.2.5, p. 7, Sec 2.4, p. 7.

* cited by examiner

CROSS-LINK INTERFERENCE (CLI) MEASUREMENTS FOR RECEIVED SIGNAL STRENGTH INDICATOR (RSSI) BASED POSITIONING

FIELD OF THE DISCLOSURE

Aspects of the present disclosure generally relate to wireless communications, and more particularly to cross-link interference (CLI) measurements for received signal strength indicator (RSSI) based positioning.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

In a time division multiplex (TDD) system, neighboring user equipment (UEs) may have different uplink-downlink (UL-DL) slot formats. In some examples, an uplink symbol for an uplink transmission of a first UE (for example, aggressor UE) overlaps a downlink symbol for a downlink transmission of a second UE (for example, victim UE). In these examples, the uplink transmission of the first UE may collide with the downlink transmission of the second UE. These types of UE-to-UE collisions may be a type of cross-link interference (CLI). In some examples, a received signal strength indicator (RSSI) may be derived from a CLI measurement. Positioning information may be derived based on the RSSI and an uplink transmission power.

SUMMARY

According to an aspect of the present disclosure, a method for wireless communication performed by a first user equipment (UE), receives, from a base station, a first message that includes a cross-link interference (CLI) configuration. The method also performs one or more CLI measurements associated with an uplink transmission of a second UE based on the CLI configuration. The method receives a second message that includes an uplink transmission power measurement of the second UE. The method determines a pathloss associated with the second UE based on the one or more CLI measurements and the uplink transmission power measurement. The method further determines a range between a location of the first UE and a location of the second UE based on the pathloss.

In another aspect of the present disclosure, a method for wireless communication performed by a UE, transmits, to a base station, an uplink message. The method also determines an uplink transmission power for transmitting the uplink message. The method receives a measurement report indicating a received signal strength indicator (RSSI) of the uplink message. The method determines a pathloss based on the RSSI and the uplink transmission power. The method further determines a pathloss based on the RSSI and the uplink transmission power.

In another aspect of the present disclosure, a method for wireless communication performed by a base station transmits, to a first UE, a first message that includes a CLI configuration. The method also receives, from the first UE, one or more CLI measurements associated with an uplink transmission of a second UE based on the CLI configuration. The method transmits, to the second UE, a second message that includes an uplink transmission power measurement configuration. The method receives, from the second UE, an uplink transmission power measurement of the second UE based on transmitting the second message. The method determines a pathloss associated with the second UE based on the CLI measurement and the uplink transmission power measurement. The method further determines a range between a location of the first UE and a location of the second UE based on the pathloss.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description, may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
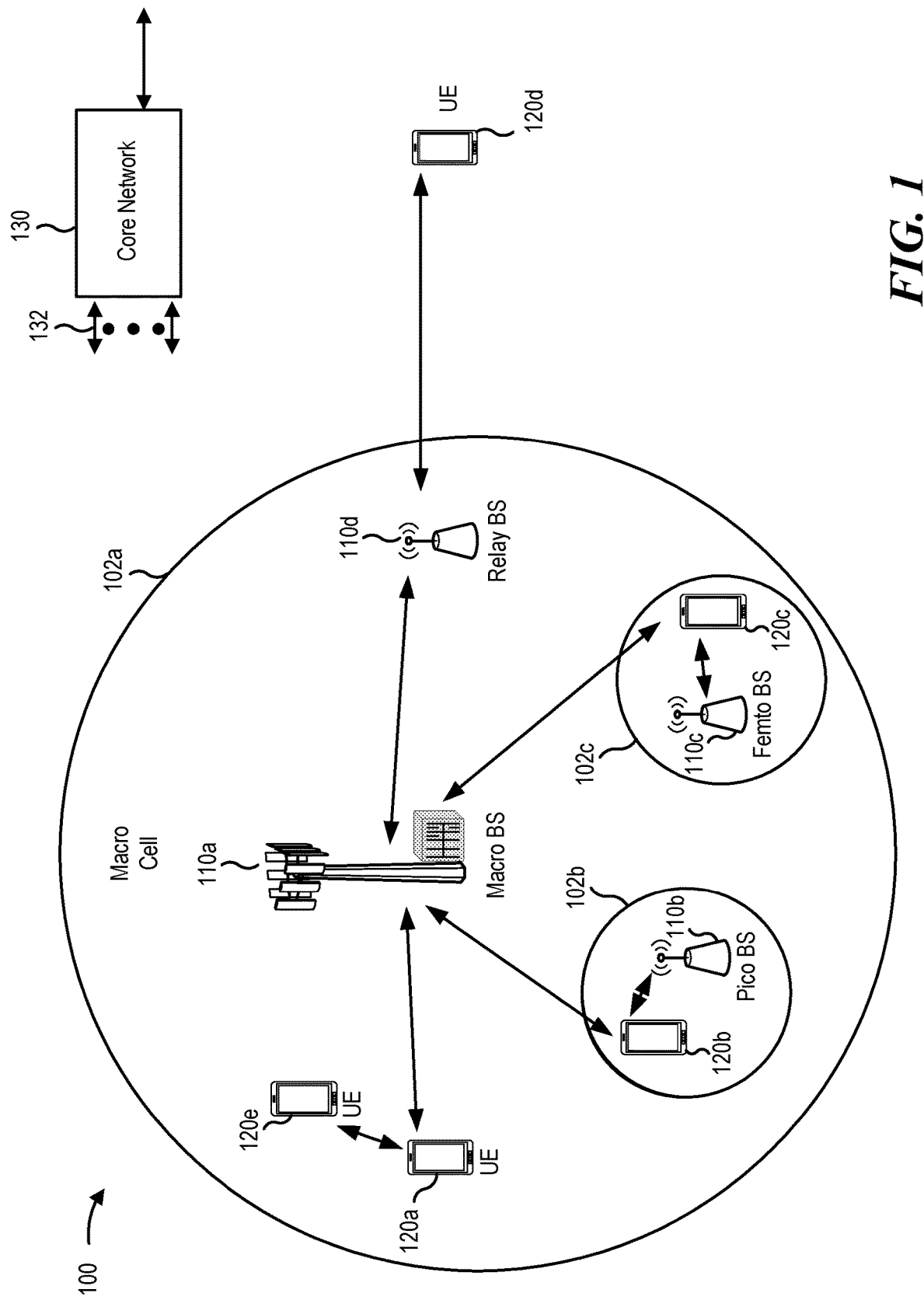
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Aspects of the present disclosure generally relate to techniques and apparatuses for determining a range between a location of a first user equipment (UE) and a location of a second UE based on a received signal strength indicator (RSSI) and a transmission power associated with the second UE. In some examples, the first UE experiences interference from the second UE. In such examples, the first UE may be referred to as a victim UE and the second UE may be referred to as an aggressor UE. In such examples, the interference may be an example of cross-link interference (CLI). In some aspects, the victim UE may determine a received signal strength indicator (RSSI) associated with a received signal transmitted by the aggressor UE. For example, the aggressor UE may transmit an uplink signal to the base station and the victim UE may determine an RSSI of the uplink signal as measured at the victim UE. The victim UE, the aggressor UE, or the base station may determine a pathloss of the uplink signal transmitted by the aggressor UE based on the RSSI and a transmit (or "transmission") power of the uplink signal. In such aspects, the RSSI may represent a received power level of the uplink signal. The victim UE, the aggressor UE or the base station may then determine a propagation delay or a range from between a location of the aggressor UE and a location of the victim UE based on the pathloss.

In some specific examples, the victim UE may determine a range between its location and a location of the aggressor UE based on the RSSI and the uplink transmission power at which the uplink signal is transmitted by the aggressor UE. In such examples, the victim UE may receive, from the base station, a first message including a CLI configuration. The CLI configuration may indicate resources on which the victim UE is to perform one or more CLI measurements of the uplink signal. The victim UE may also receive a second message indicating an uplink transmission power measurement of the uplink signal transmitted by the aggressor UE. The second message may be received from the base station via a downlink transmission or from the aggressor UE via a sidelink transmission. In such examples, the victim UE may also determine a pathloss associated with the aggressor UE based on the one or more CLI measurements and the uplink transmission power measurement. The victim UE may determine a range between the location of the victim UE and the location of the aggressor UE based on the pathloss.

In some other examples, the aggressor UE may determine a range between its location and the location of the victim UE based on the RSSI and the uplink transmission power at which the uplink signal is transmitted by the aggressor UE. In such examples, the aggressor UE may receive a measurement report indicating the RSSI of the uplink signal. The measurement report may be received from the base station via a downlink transmission or from the victim UE via a sidelink transmission. In such examples, the aggressor UE may determine a pathloss based on the RSSI and the uplink transmission power, and determine the range between its location and a location of the victim UE based on the pathloss.

In other examples, the base station may determine a range between a location of the aggressor UE and a location of the victim UE based on the RSSI and the uplink transmission power associated with the aggressor UE. In such examples, the base station transmits, to the victim UE, a first message including a CLI configuration. The base station may receive, from the victim UE, one or more CLI measurements associated with the uplink signal transmitted by the aggressor UE based on the CLI configuration. Additionally, in such examples, the base station may transmit, to the aggressor UE, a second message including an uplink transmission power measurement configuration. In some specific examples, the resources configured by the uplink transmission power measurement configuration may be the same resources as the resources configured by the CLI configuration. The base station may then receive, from the aggressor UE, an uplink transmission power measurement associated with the transmission of the uplink signal. In such examples, the base station may determine a pathloss associated with the aggressor UE based on the CLI measurements and the uplink transmission power measurement, and determine the range between the location of the victim UE and the location of the aggressor UE based on the pathloss.

Particular aspects of the subject matter described in this disclosure may be implemented to realize one or more of the following potential advantages. In some examples, a low-tier UE, such as an NR-light UE, may be specified to operate with limited power and limited processing capabilities. In these examples, the limited power and the limited processing capabilities may constrain or reduce the accuracy of positioning functions of the low-tier UE. However, the CLI measurements performed at a UE, such as a victim UE, may overcome these constraints. In such examples, the CLI measurements may include an RSSI or sounding reference signal (SRS)-received RSRP measurement of an aggressor UE, which may enable more accurate positioning.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

As an example, the BSs 110 (shown as BS 110a, BS 110b, BS 110c, and BS 110d) and the core network 130 may exchange communications via backhaul links 132 (e.g., S1, etc.). Base stations 110 may communicate with one another over other backhaul links (e.g., X2, etc.) either directly or indirectly (e.g., through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless communications system 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
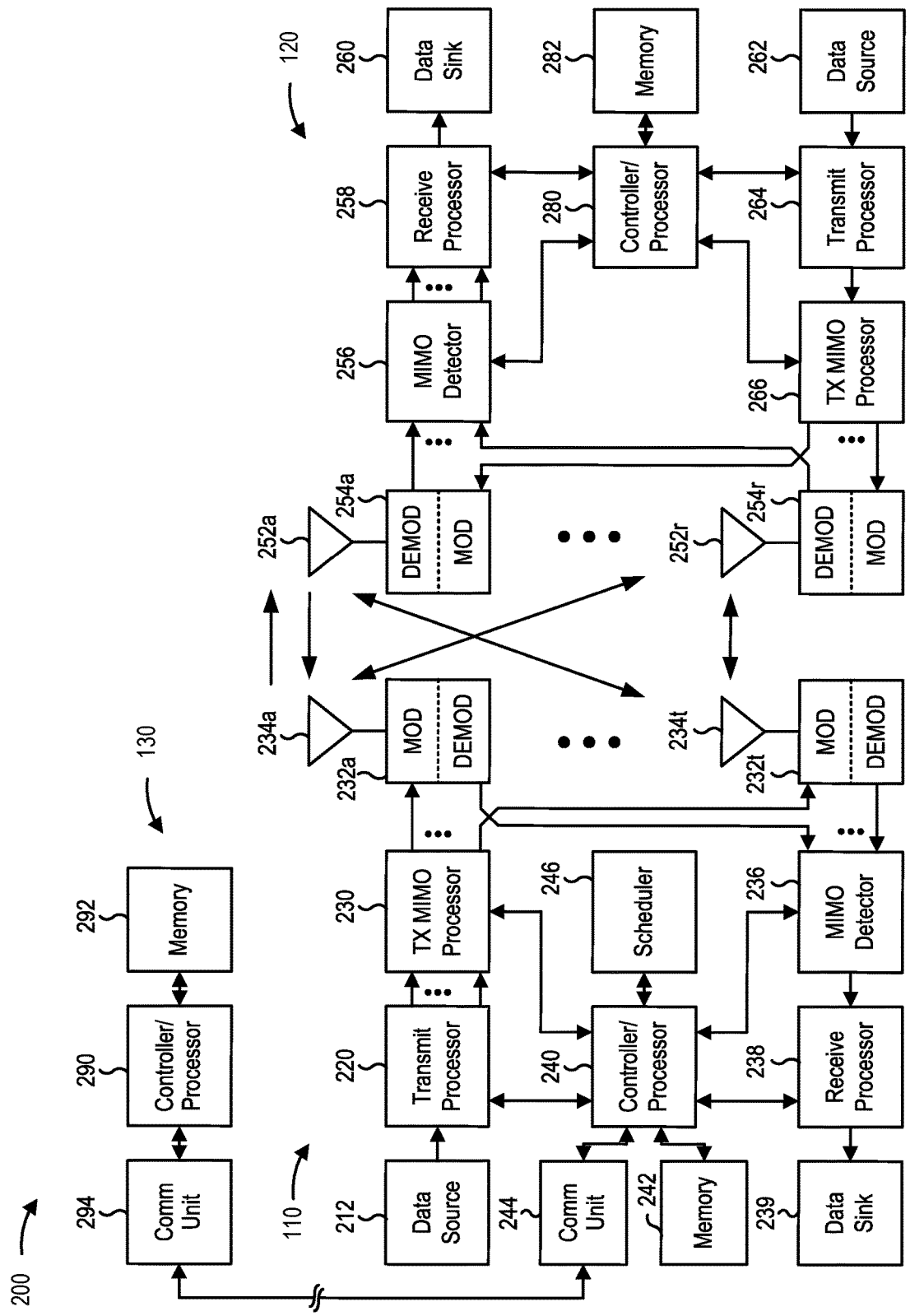
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine an RSRP, received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with RSSI based positioning as described in more detail elsewhere. For example, the controller/processor 240 of the base station 110, the controller/processor 280 of the UE 120, and/or any other component(s) of FIG. 2 may perform or direct operations of, for example, the process of FIGS. 13, 14, and 15, and other processes as described. Memories 242 and 282 may store data and program codes for the base station 110 and UE 120, respectively. A scheduler 246 may schedule UEs for data transmission on the downlink and/or uplink.

As described, in a time division multiplex (TDD) system, different uplink-downlink (UL-DL) slot formats may be specified for neighboring UEs. That is, a UL-DL slot format of a first UE may be different from a UL-DL slot format of a second UE, where the second UE neighbors the first UE.

Figure 3:
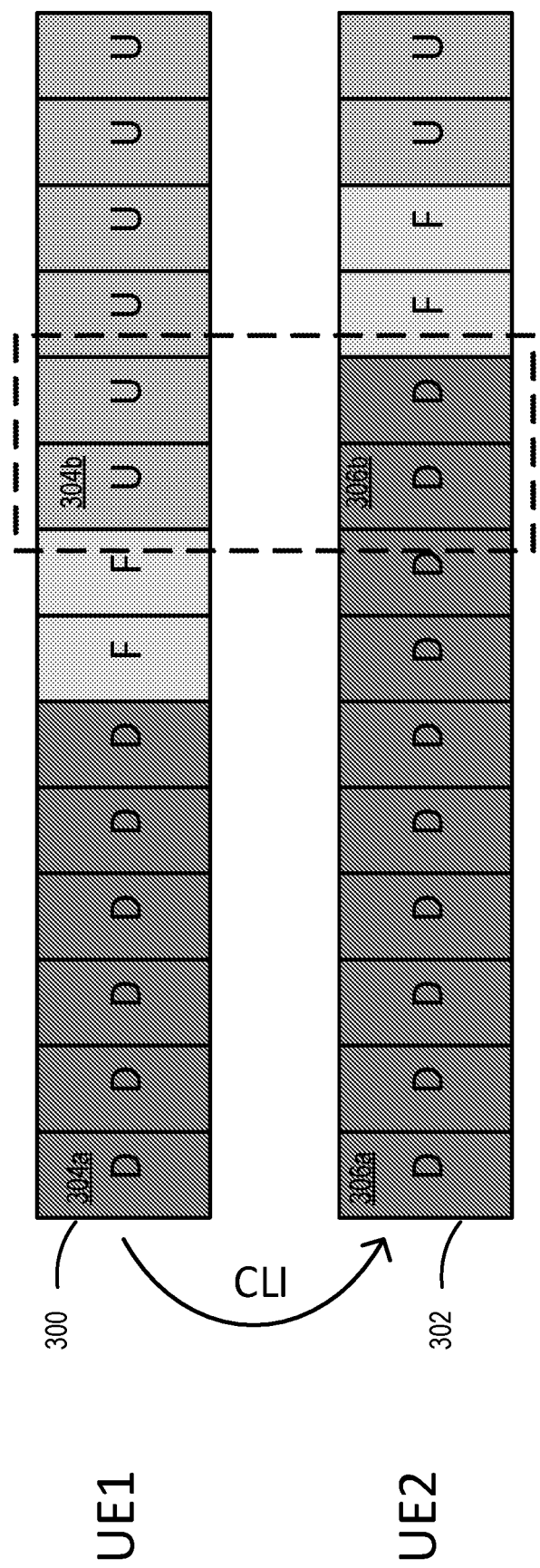
FIG. 3 is a diagram illustrating cross-link interference (CLI), in accordance with aspects of the present disclosure.

FIG. 3 is a diagram illustrating an example of UL-DL slot format mismatch. As shown in FIG. 3, a first UE (UE1) may be configured with a first UL-DL slot format 300 and a second UE (UE2) may be configured with a second UL-DL slot format 302. In the example of FIG. 3, a number of OFDM symbols (for example, fourteen or twelve) may be defined for each slot in the UL-DL slot formats 300 and 302. The OFDM symbols may be categorized as downlink symbols (D), uplink symbols (U), or flexible symbols (F). As an example, as shown in FIG. 3, a first symbol 304a of the first UL-DL slot format 300 may be configured for downlink (D) communications and a first symbol 306a of the second UL-DL slot format 302 may be configured for downlink (D) communications. As another example, as shown in FIG. 3, a second symbol 304b of the first UL-DL slot format 300 may be configured for uplink (U) communications and a second symbol 306b of the second UL-DL slot format 302 may be configured for downlink (D) communications.

In this example, an uplink transmission in the second symbol 304b of the first UE may collide (for example, interfere) with a downlink transmission in the second symbol 306b of the second UE. The collision caused by the mismatch between the OFDM symbol 304b of the first UE and the OFDM symbol 306b of the second UE may be a type of CLI. In some examples, the uplink transmission in the second symbol 304b may be a control signal on physical uplink control channel (PUCCH), a data message on a physical uplink shared channel (PUSCH), a physical random access channel (PRACH) preamble, or a sounding reference signal (SRS). In the example of FIG. 3, the first UE is an example of an aggressor UE and the second UE is an example of a victim UE.

Figure 4:
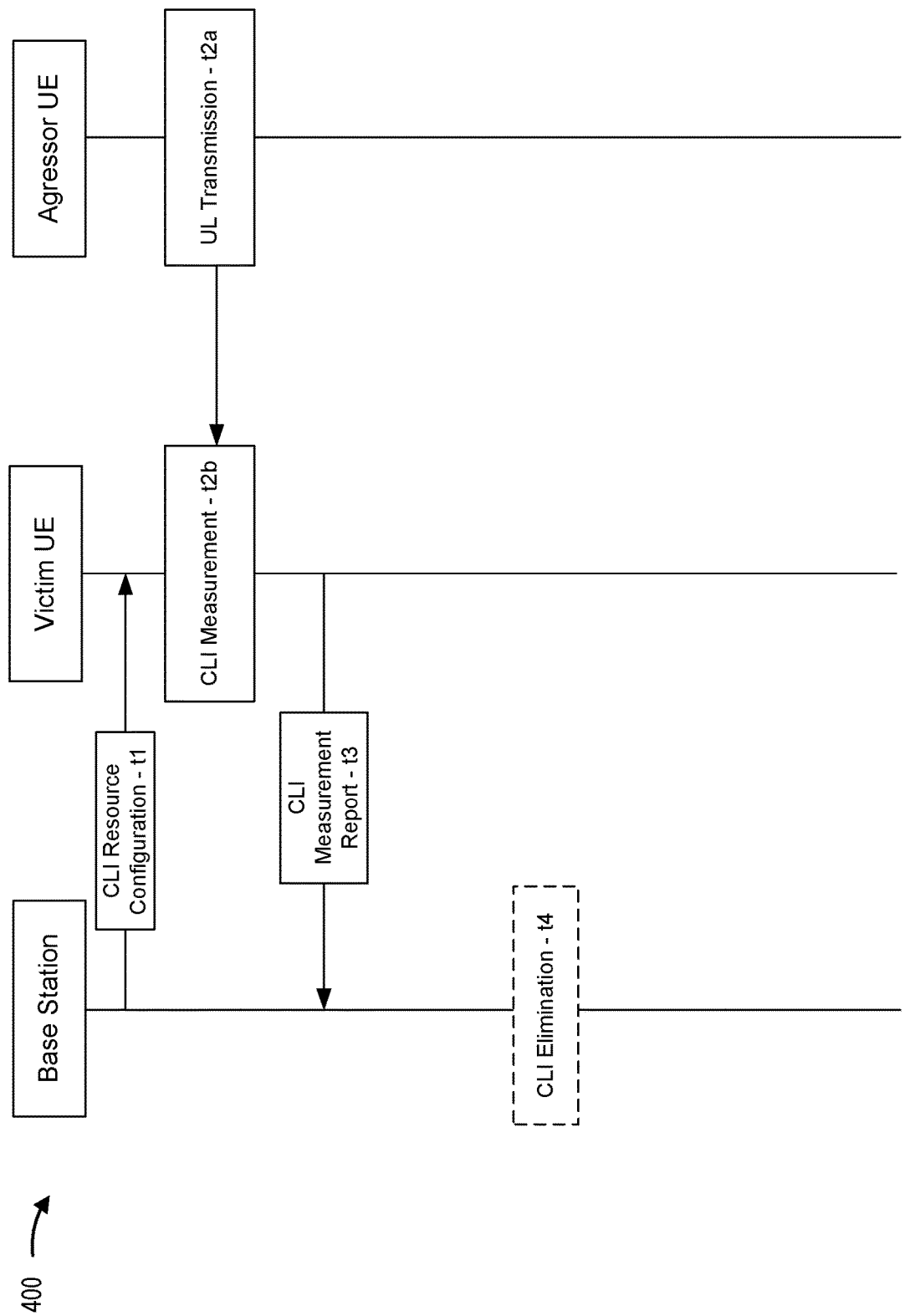
FIG. 4 is a timing diagram illustrating an example of CLI measurement, in accordance with aspects of the present disclosure.

FIG. 4 is a timing diagram 400 illustrating an example for CLI measurement, in accordance with aspects of the present disclosure. In some examples, a base station (for example, gNB) configures CLI measurement resources for interference management. As shown in FIG. 4, at time t1, a network transmits a CLI resource configuration (for example, CLI measurement resource configuration) to a victim UE for interference management. For ease of explanation, the example of FIG. 4 is directed to one victim UE. Aspects of the present disclosure are not limited to one victim UE. In some implementations, multiple victim UEs may be configured to perform CLI measurements. The CLI configuration may be provided in one or more measurement objects and may identify CLI resources for measurement. For example, the CLI configuration may identify a periodicity of an uplink transmission, a frequency of the uplink transmission, and symbols of the uplink transmission. As shown in FIG. 4, at time t2a, the aggressor UE performs an uplink transmission. Additionally, at time t2b, the victim UE performs one or more CLI measurements associated with the uplink transmission of the aggressor UE. The one or more CLI measurements do not impact the uplink transmission of the aggressor UE. In some implementations, the victim UE may measure an SRS-RSRP or an RSSI based on the CLI resources identified in the CLI resource configuration. Furthermore, as shown in FIG. 4, at time t3, the victim UE transmits a CLI measurement report to the base station. The CLI measurement report indicates the one or more CLI measurements performed at time t2b. In optional implementations, at time t4, the base station may initiate a CLI elimination procedure.

Figure 5:
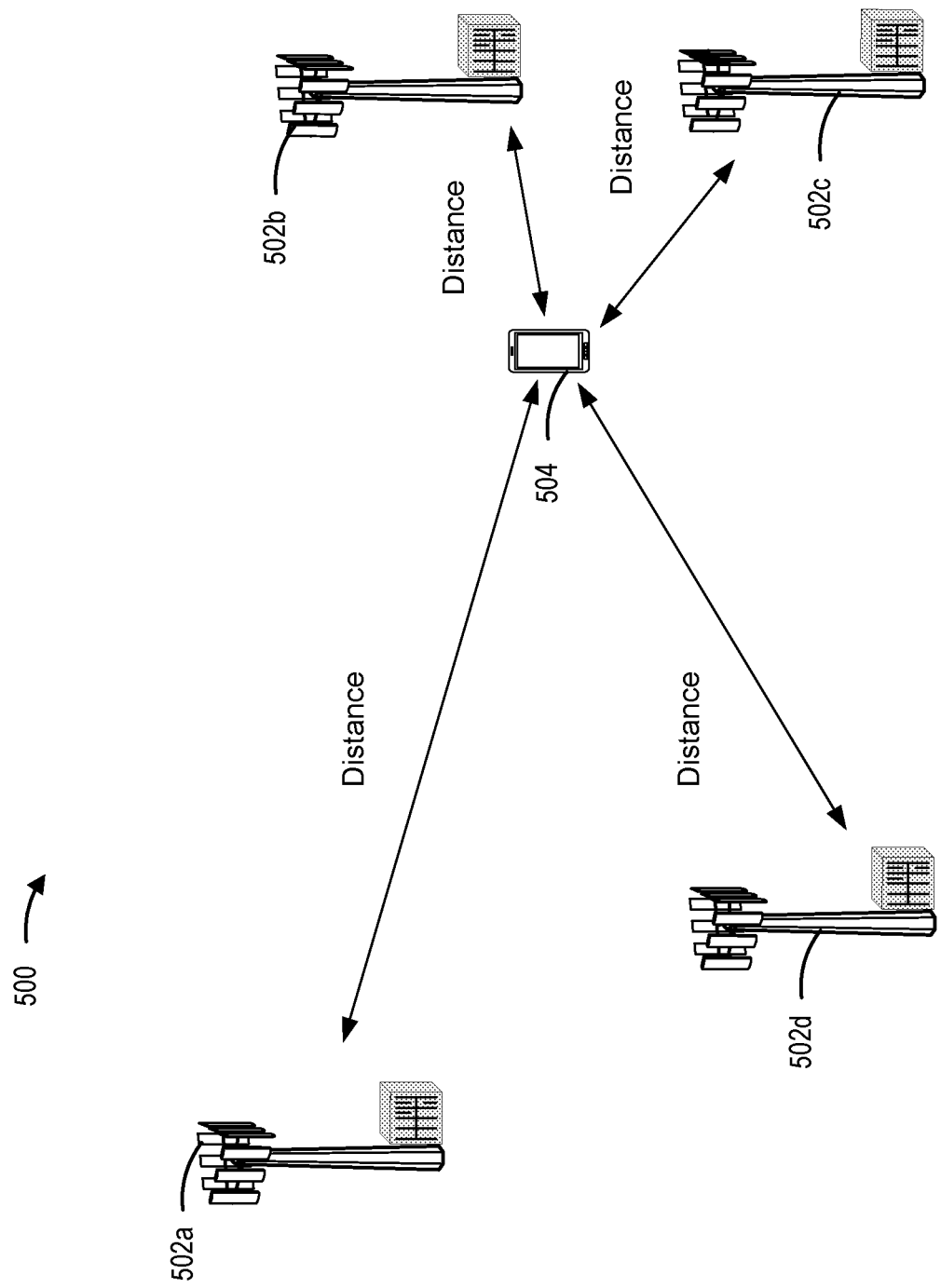
FIG. 5 is a block diagram illustrating an example of received signal strength indicator (RSSI) based positioning, in accordance with aspects of the present disclosure.

FIG. 5 is a diagram illustrating an example 500 of RSSI based positioning. In some examples, the RSSI, or received signal strength (RSS), may be used for positioning. As shown in the example of FIG. 5, a location of each base station 502a, 502b, 502c, and 502d may be fixed. Furthermore, one or more base stations 502a, 502b, 502c, and 502d may measure a signal strength (for example, RSSI) of an uplink transmission of the UE 504. The one or more base stations 502a, 502b, 502c, and 502d may share the measured RSSI. In some examples, the UE 506 may share an uplink transmission power with one or more base stations 502a, 502b, 502c, and 502d. The base stations 502a, 502b, 502c, and 502d may share the measured RSSI and the uplink transmission power via a backhaul connection. In this example, each base station 502a, 502b, 502c, and 502d may derive a pathloss from the RSSI and an uplink transmission power of the UE 504. Additionally, each base station 502a, 502b, 502c, and 502d may determine a respective distance (for example, propagation distance) to the UE 504 from the pathloss. Furthermore, each base station 502a, 502b, 502c, and 502d may determine a service area by plotting a service circle (not shown) with a radius based on the respective distance to the UE 504. A location of the UE 506 may be determined based on an intersection of the service circles of the base stations 502a, 502b, 502c, and 502d. Determining the location of the UE 506 based on the intersection of the service circles may be an example of triangulation.

In some cases, network synchronization errors may cause inaccurate position calculations. That is, network synchronization errors may prevent high precision positioning. Furthermore, positioning based on an RSSI, such as triangulation based on the RSSI, may be less accurate than positioning solutions described in NR Release 16 and beyond. For example, a round trip time (RTT) based solution technique may be more accurate than an RSSI based positioning solution.

In some examples, a low-tier UE, such as an NR-light UE, may be specified to operate with limited power and limited processing capabilities. In these examples, the limited power and the limited processing capabilities may constrain and reduce the accuracy of positioning functions of the low-tier UE. Still, in these examples, the CLI measurements performed at a UE, such as a victim UE, may overcome the described constrains. That is, the CLI measurements may provide an RSSI measurement of an aggressor UE, and the RSSI measurement may be used for positioning.

As described, RSSI based positioning may be less accurate in comparison to other positioning techniques, such as RTT positioning. Still, RSSI based positioning may consume less power and computing resources in comparison to other positioning techniques, such as RTT positioning. Therefore, RSSI based positioning may be desirable for some UEs, such as a low-power UE (for example, NR light UEs). Aspects of the present disclosure are directed to determining a UE position based on CLI RSSI measurements.

Figure 6:
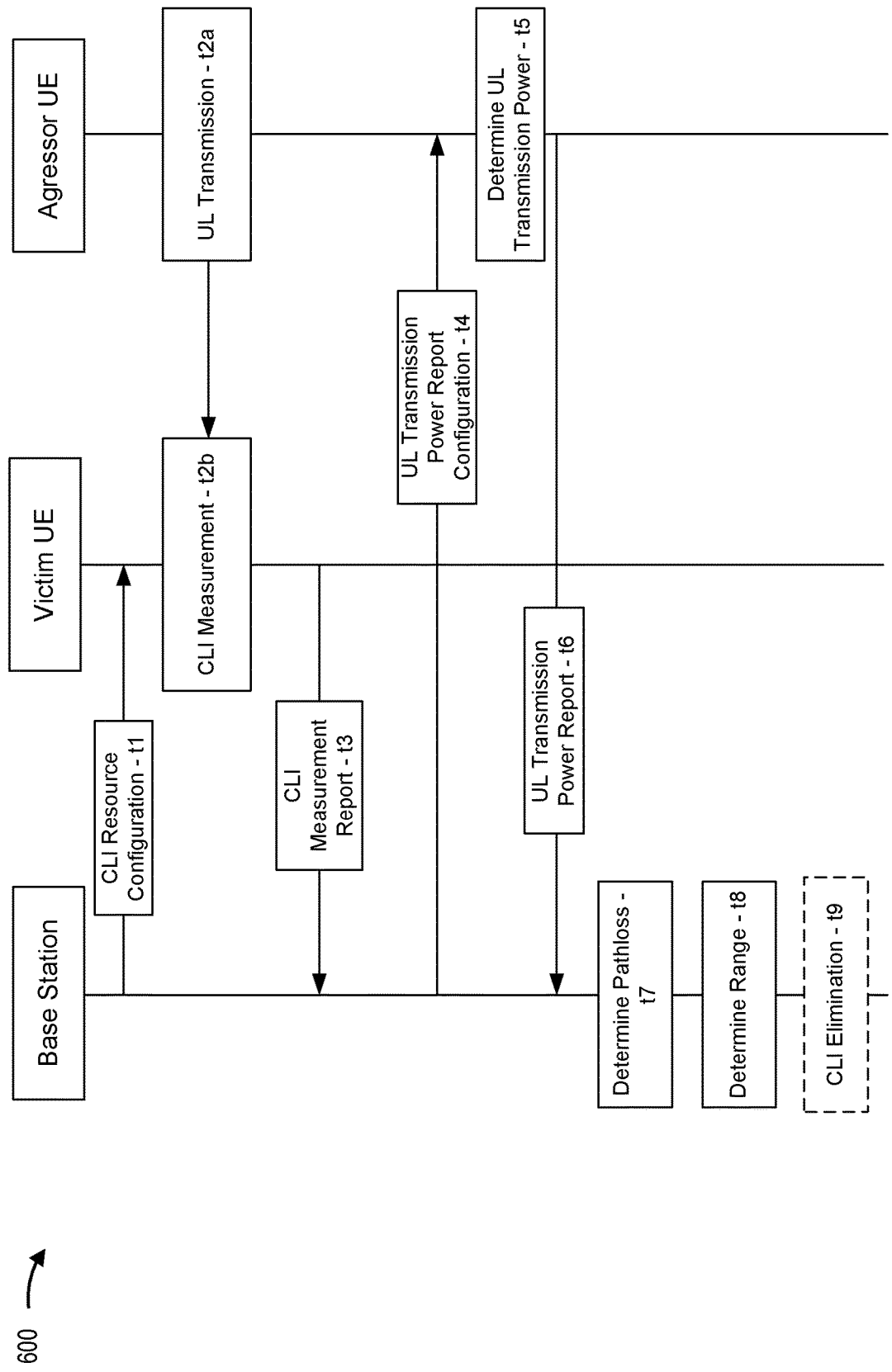
FIG. 6 is a timing diagram illustrating an example of network based positioning, in accordance with aspects of the present disclosure.

In some examples, the pathloss of a signal may be determined based on the transmit power of the signal and the RSSI. In these examples, the RSSI may represent a received power level. A receiver may determine a propagation delay or range from a transmitter based on the pathloss. In some implementations, a base station determines a range between a victim UE and an aggressor UE based on the RSSI and a transmission power associated with the aggressor UE. FIG. 6 is a timing diagram 600 illustrating an example of network based positioning, according to aspects of the present disclosure. In the example of FIG. 6, at time t1, a base station, such as a base station 110 described with reference to FIG. 1, transmits a CLI resource configuration (for example, CLI measurement resource configuration) to a victim UE for interference management. For ease of explanation, the example of FIG. 6 is directed to one victim UE. Aspects of the present disclosure are not limited to one victim UE. In some implementations, multiple victim UEs may be configured to perform CLI measurements. The CLI configuration may be provided in one or more measurement objects and may identify CLI resources for measurement, such as a periodicity, a frequency, and symbols. As shown in FIG. 6, at time t2a, the aggressor UE performs an uplink transmission. Additionally, at time t2b, the victim UE performs one or more CLI measurements associated with the uplink transmission of the aggressor UE. The one or more CLI measurements do not impact the uplink transmission of the aggressor UE. In the example of FIG. 6, the one or more CLI measurements may be CLI RSSI measurements or CLI SRS-RSRP based on the CLI resources identified in the CLI resource configuration. Furthermore, as shown in FIG. 6, at time t3, the victim UE transmits a CLI measurement report to the base station. The CLI measurement report indicates the one or more CLI measurements performed at time t2b. In the example of FIG. 6, the victim UE and the aggressor UE are examples of UEs 120 described with reference to FIG. 1.

As shown in FIG. 6, at time t4, the base station transmits an uplink transmission power report configuration to the aggressor UE. The uplink transmission power report configuration configures one or more resource blocks and one or more symbols associated with a second uplink transmission (not shown) of the aggressor UE. The one or more resource blocks and one or more symbols associated with a second uplink transmission are the same as one or more resource blocks, and one or more symbols associated with the uplink transmission performed at time t2a. That is, the resources configured by the uplink transmission power report configuration may match the resources configured by the CLI resource configuration. The uplink transmission power report configuration may be indicated in downlink control information (DCI), a media access control (MAC) message, a control element (CE), or radio resource configuration (RRC) signaling.

Furthermore, as shown in FIG. 6, at time t5, the aggressor UE determines an uplink transmission power based on the uplink transmission power report configuration. Additionally, at time t6, the aggressor UE transmits an uplink transmission power report indicating the uplink transmission power. The uplink transmission power report may be transmitted in response to measuring the uplink transmission power. In some implementations, at time t7, the base station determines a pathloss associated with the aggressor UE based on the CLI measurement and the uplink transmission power. In this implementation, at time t8, the base station determines a range between a location of the victim UE and a location of the aggressor UE based on the pathloss. In an optional implementation, at time t9, the base station may initiate a CLI elimination procedure.

Figure 7:
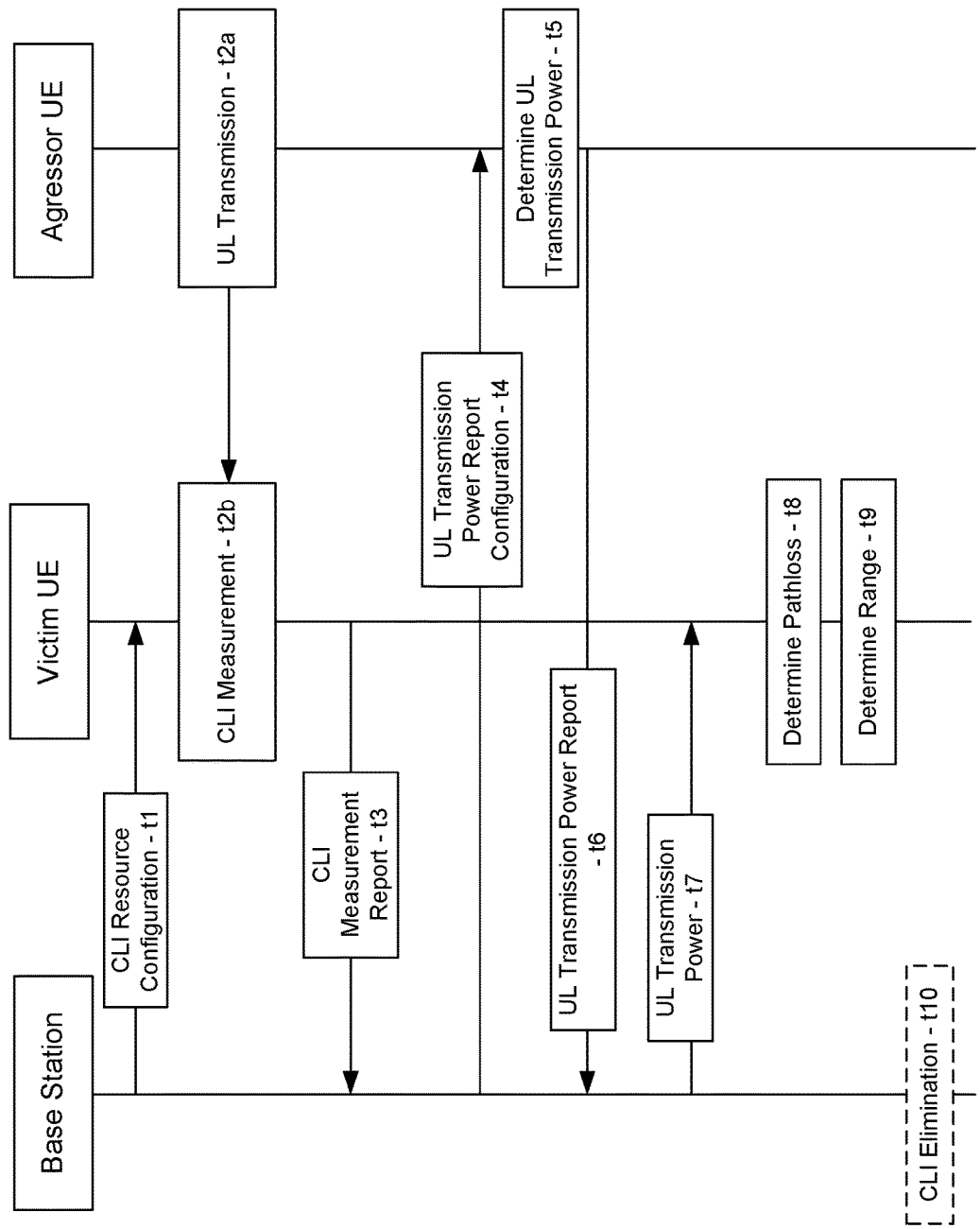
FIG. 7 is a timing diagram illustrating an example of victim UE based positioning in accordance with aspects of the present disclosure.

In some implementations, the victim UE determines a range between its location and a location of the aggressor UE based on the pathloss. FIG. 7 is a timing diagram 700 illustrating an example of the victim UE based positioning, according to aspects of the present disclosure. In the example of FIG. 7, the processes performed at times t1-t5 are similar to the processes of times t1-t6 described with reference to FIG. 6. Additionally, in the example of FIG. 7, at time t7, the base station transmits the uplink transmission power associated with the aggressor UE to the victim UE. In one implementation, at time t8, the victim UE determines a pathloss associated with the aggressor UE based on the CLI measurement and the uplink transmission power. In this implementation, at time t9, the victim UE determines a range between its location and the location of the aggressor UE based on the pathloss. In an optional implementation, at time t10, the base station may initiate a CLI elimination procedure.

Figure 8:
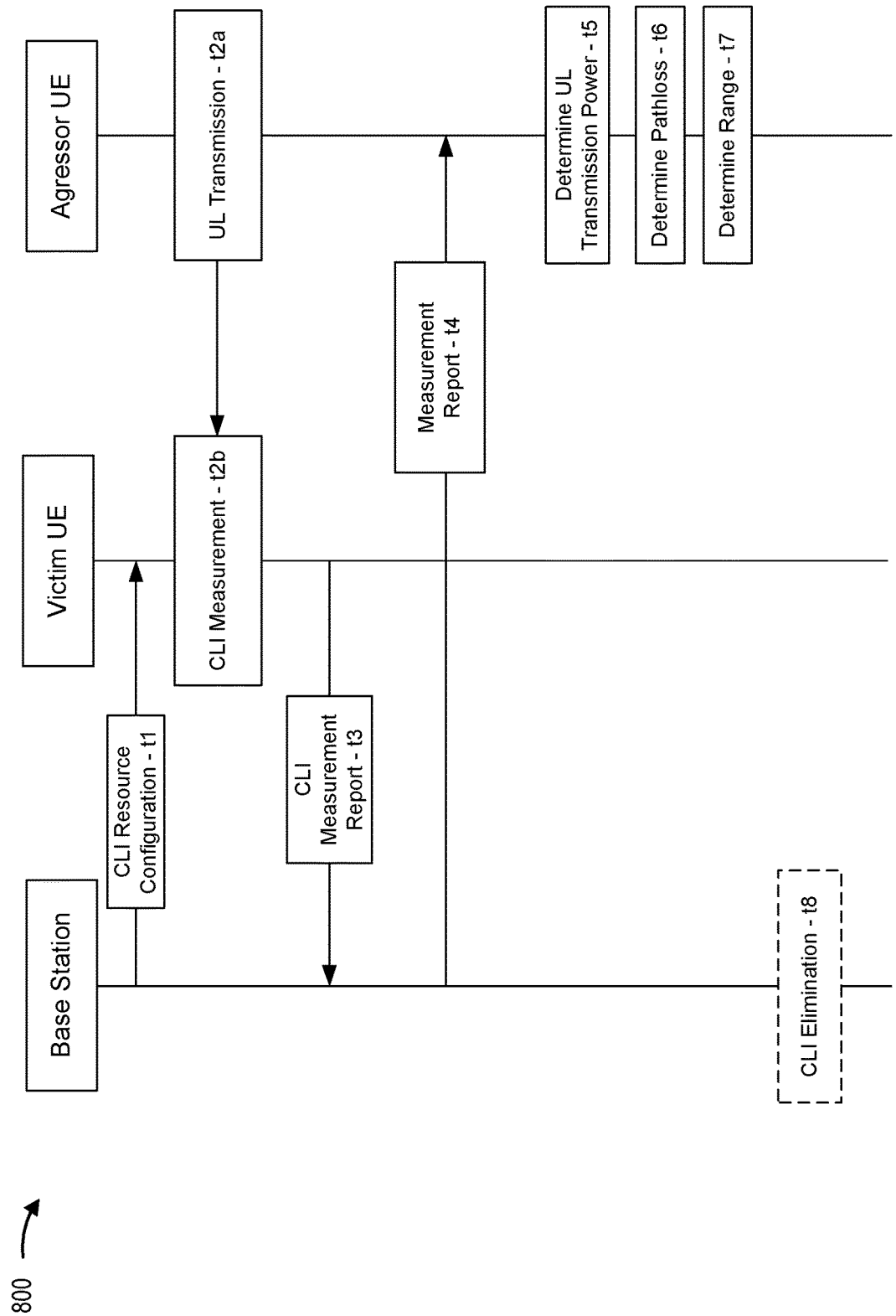
FIG. 8 is a timing diagram illustrating an example of aggressor UE based positioning, in accordance with aspects of the present disclosure.

In some implementations, the aggressor UE determines a range between its location and a location of the victim UE based on the pathloss. FIG. 8 is a timing diagram 800 illustrating an example of aggressor UE based positioning, according to aspects of the present disclosure. In the example of FIG. 8, the processes performed at times t1-t3 are similar to the processes of times t1-t3 described with reference to FIG. 6. Additionally, in the example of FIG. 8, at time t4, the base station transmits a measurement report indicating an RSSI of the uplink message transmitted at time t2a. In one implementation, at time t5, the aggressor UE determines an uplink transmission power. In some examples, the uplink transmission power may be a transmission power for the uplink transmission performed at time t2a. Additionally, in some examples, at time t6, the aggressor UE determines a pathloss based on the CLI measurement and the uplink transmission power. In these examples, at time t7, the aggressor UE determines a range between its location and the location of the victim UE based on the pathloss. In an optional implementation, at time t8, the base station may initiate a CLI elimination procedure.

Figure 9A:
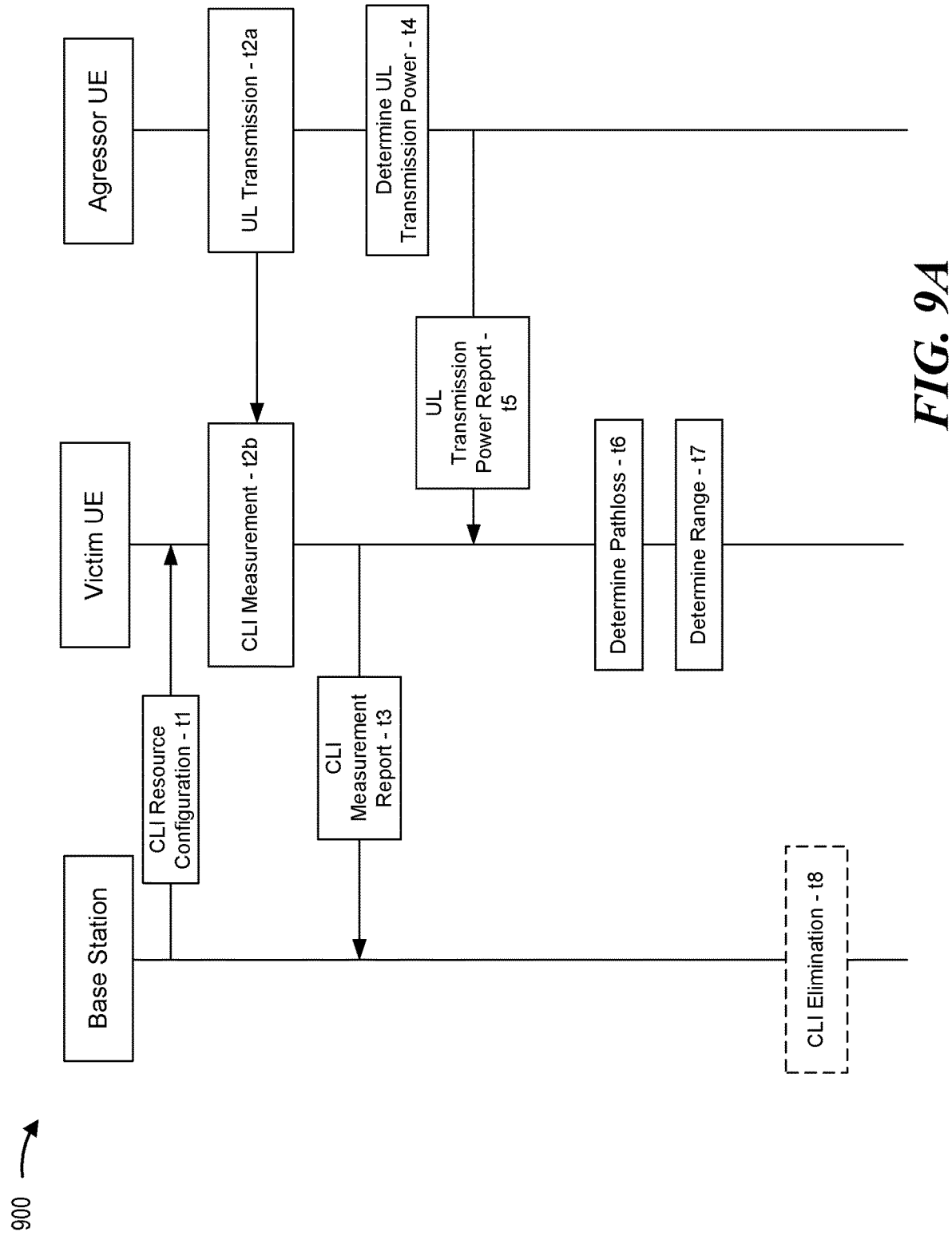
FIG. 9A is a timing diagram illustrating an example for received signal strength indicator (RSSI) positioning for a sidelink UE, in accordance with aspects of the present disclosure.

In some implementations, the victim UE and the aggressor UE may be configured for sidelink communication. FIG. 9A is a timing diagram 900 illustrating an example for RSSI positioning for a sidelink UE, in accordance with aspects of the present disclosure. In the example of FIG. 9A, the victim UE and the aggressor UE may be configured for UE-to-UE communication (for example, vehicle-to-vehicle (V2V) communication or vehicle-to-everything (V2X) communication) over one or more sidelink channels. In the example of FIG. 9A, the processes performed at times t1-t3 are similar to the processes of times t1-t3 described with reference to FIG. 6. Additionally, in the example of FIG. 9A, at time t4, the aggressor UE determines an uplink transmission power. Additionally, at time t5, the aggressor UE transmits an uplink transmission power report indicating the uplink transmission power to the victim UE over a sidelink channel. The uplink transmission power report may be transmitted in response to measuring the uplink transmission power. In some implementations, at time t6, the victim UE determines a pathloss associated with the aggressor UE based on the CLI measurement and the uplink transmission power. In this implementation, at time t7, the victim UE determines a range between its location and a location of the aggressor UE based on the pathloss. In an optional implementation, at time t8, the base station may initiate a CLI elimination procedure.

Figure 9B:
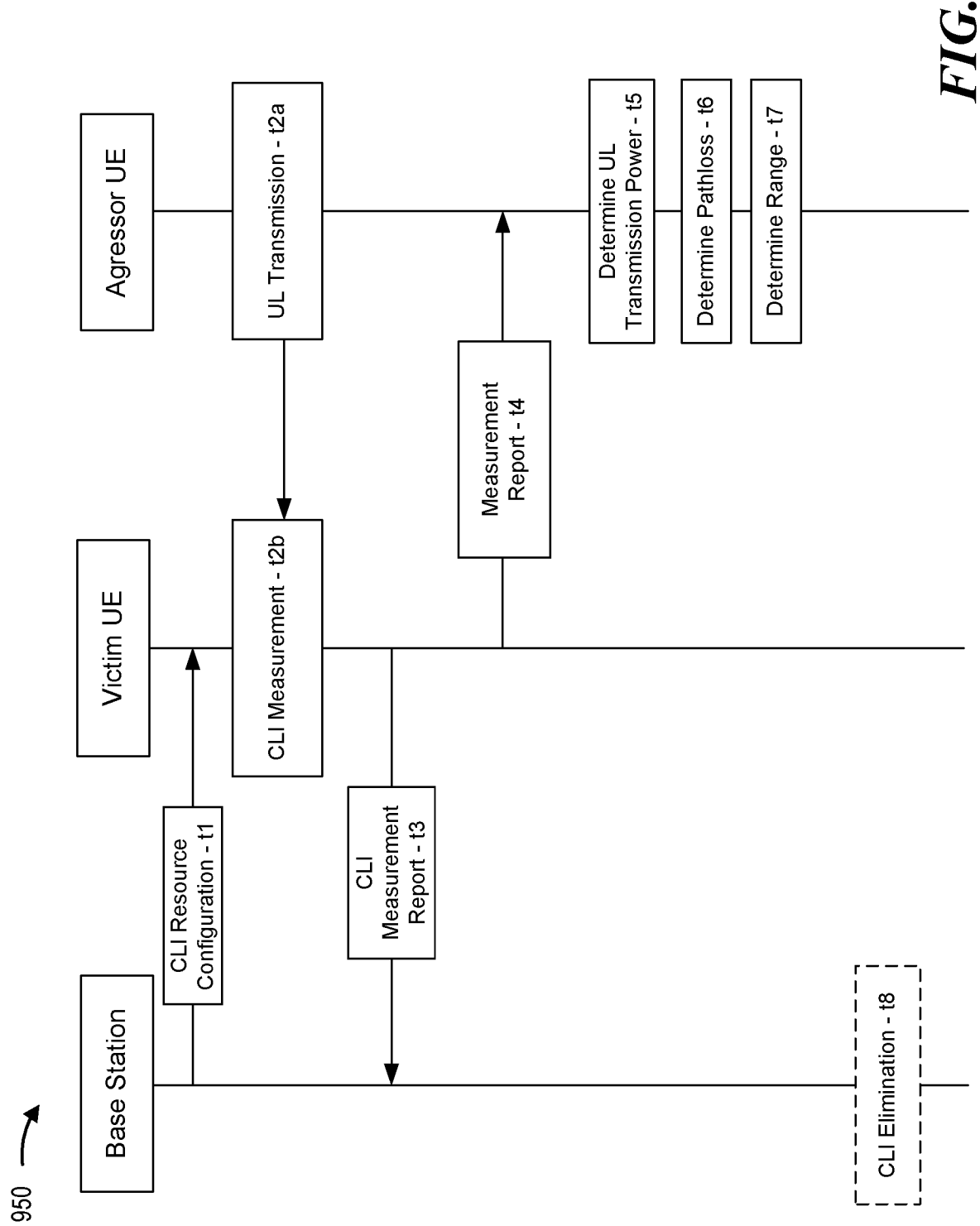
FIG. 9B is a timing diagram illustrating an example for RSSI positioning for a sidelink UE, in accordance with aspects of the present disclosure.

FIG. 9B is a timing diagram 950 illustrating an example for RSSI positioning for a sidelink UE, in accordance with aspects of the present disclosure. In the example of FIG. 9B, the victim UE and aggressor UE may be configured for UE-to-UE communication (for example, V2V communication or V2X communication) over one or more sidelink channels. In the example of FIG. 9B, the processes performed at times t1-t3 are similar to the processes of times t1-t3 described with reference to FIG. 6. Additionally, in the example of FIG. 9B, at time t4, the victim UE transmits a measurement report indicating an RSSI of the uplink message transmitted at time t2a. The measurement report may be transmitted over a sidelink channel. In one implementation, at time t5, the aggressor UE determines an uplink transmission power. In some examples, the uplink transmission power may be a transmission power for the uplink transmission performed at time t2a. Additionally, in some examples, at time t6, the aggressor UE determines a pathloss based on the CLI measurement and the uplink transmission power. In these examples, at time t7, the aggressor UE determines a range between its location and the location of the victim UE based on the pathloss. In an optional implementation, at time t8, the base station may initiate a CLI elimination procedure.

Figure 10:
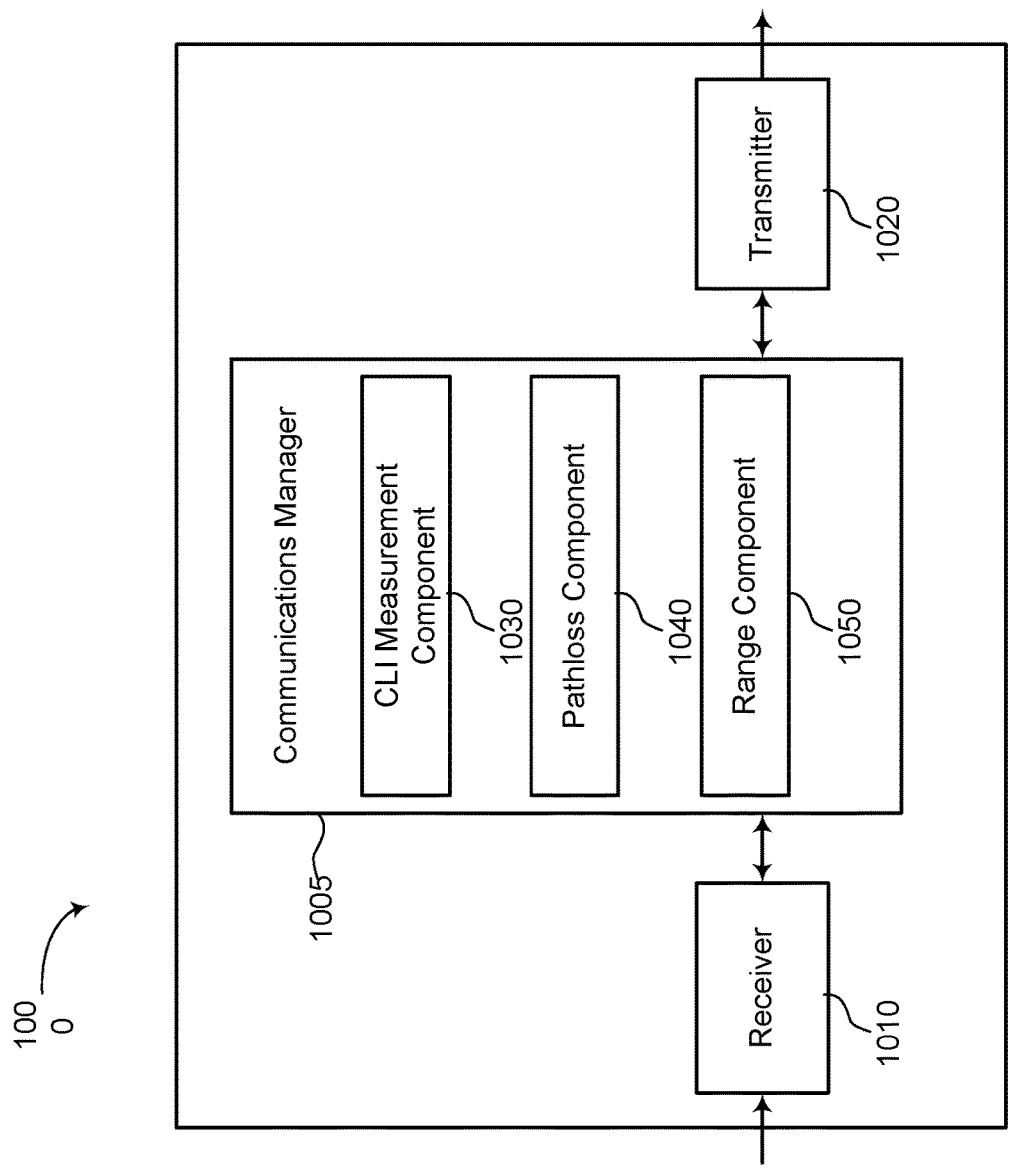
FIG. 10 is a block diagram illustrating an example of a wireless communication device that supports RSSI based positioning, in accordance with aspects of the present disclosure.

FIG. 10 is a block diagram illustrating an example of a wireless communication device 1000 that supports RSSI based positioning, in accordance with aspects of the present disclosure. The device 1000 may be an example of aspects of a UE 120 described with reference to FIG. 1. In some examples, the device 1000 may be an example of a victim UE, as described with reference to FIGS. 6, 7, 8, 9A, and 9B. The wireless communication device 1000 may include a receiver 1010, a communications manager 1005, a transmitter 1020, a CLI measurement component 1030, a pathloss component 1040, and a range component 1050, which may be in communication with one another (for example, via one or more buses). In some examples, the wireless communication device 1000 is configured to perform operations, including operations of the process 1200 described below with reference to FIG. 12.

In some examples, the wireless communication device 1000 can include a chip, chipset, package, or device that includes at least one processor and at least one modem (for example, a 5G modem or other cellular modem). In some examples, the communications manager 1005, or its subcomponents, may be separate and distinct components. In some examples, at least some components of the communications manager 1005 are implemented at least in part as software stored in a memory. For example, portions of one or more of the components of the communications manager 1005 can be implemented as non-transitory code executable by the processor to perform the functions or operations of the respective component.

The receiver 1010 may receive one or more reference signals (for example, periodically configured CSI-RSs, aperiodically configured CSI-RSs, or multi-beam-specific reference signals), synchronization signals (for example, SSBs), control information and data information, such as in the form of packets, from one or more other wireless communication devices via various channels including control channels (for example, a physical downlink control channel (PDCCH)) and data channels (for example, a PDSCH). The other wireless communication devices may include, but are not limited to, a base station 110 described with reference to FIG. 1.

The received information may be passed on to other components of the device 1000. The receiver 1010 may be an example of aspects of the receive processor 258 described with reference to FIG. 2. The receiver 1010 may include a set of radio frequency (RF) chains that are coupled with or otherwise utilize a set of antennas (for example, the set of antennas may be an example of aspects of the antennas 252*a* through 252*r* described with reference to FIG. 2).

The transmitter 1020 may transmit signals generated by the communications manager 1005 or other components of the wireless communication device 1000. In some examples, the transmitter 1020 may be collocated with the receiver 1010 in a transceiver. The transmitter 1020 may be an example of aspects of the transmit processor 254 described with reference to FIG. 2. The transmitter 1020 may be coupled with or otherwise utilize a set of antennas (for example, the set of antennas may be an example of aspects of the antennas 252*a* through 252*r* described with reference to FIG. 2), which may be antenna elements shared with the receiver 1010. In some examples, the transmitter 1020 is configured to transmit control information in a PUCCH and data in a PUSCH.

The communications manager 1005 may be an example of aspects of the controller/processor 280 described with reference to FIG. 2. The communications manager 1005 may include the CLI measurement component 1030, the pathloss component 1040, and the range component 1050. In one implementation, working in conjunction with the receiver 1010, the CLI measurement component 1030 may receive a CLI configuration from a base station. The CLI configuration may indicate CLI resources for measurement. For example, the resources may include a resource block and a symbol of the uplink transmission from a neighboring UE, such as an aggressor UE. Additionally, working in conjunction with the receiver 1010, the CLI measurement component 1030 may perform one or more CLI measurements associated with an uplink transmission based on the CLI configuration. In this implementation, working in conjunction with the receiver 1010, the pathloss component 1040 may receive an uplink transmission power of the aggressor UE. Additionally, the pathloss component 1040 may determine a pathloss associated with the aggressor UE based on one or more CLI measurements and the uplink transmission power. Furthermore, in this implementation, the range component 1050 may determine a range between a location of the device 1000 and the aggressor UE based on the pathloss.

Figure 11:
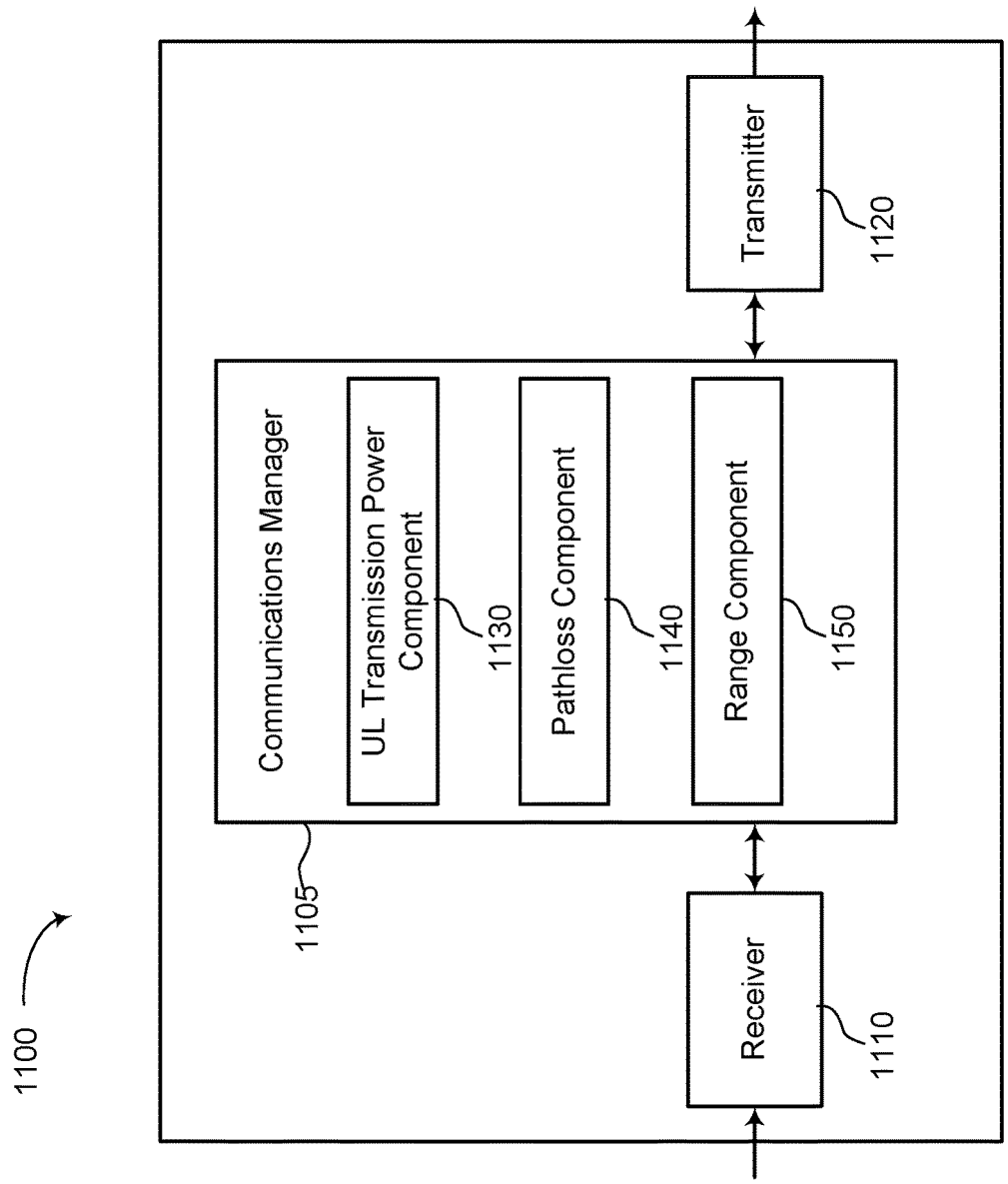
FIG. 11 is a block diagram illustrating an example of a wireless communication device that supports RSSI based positioning, in accordance with aspects of the present disclosure.

FIG. 11 is a block diagram illustrating an example of a wireless communication device 1100 that supports CLI RSSI based positioning, in accordance with aspects of the present disclosure. The device 1100 may be an example of aspects of a UE 120 described with reference to FIG. 1. In some examples, the device 1100 may be an example of an aggressor UE, as described with reference to FIGS. 6, 7, 8, 9A, and 9B. The wireless communication device 1100 may include a receiver 1110, a communications manager 1105, a transmitter 1120, an uplink transmission power component 1130, a pathloss component 1140, and a range monitoring component 1150, which may be in communication with one another (for example, via one or more buses). In some examples, the wireless communication device 1100 is configured to perform operations, including operations of the process 1400 described below with reference to FIG. 14.

In some examples, the wireless communication device 1100 can include a chip, chipset, package, or device that includes at least one processor and at least one modem (for example, a 5G modem or other cellular modem). In some examples, the communications manager 1105, or its subcomponents, may be separate and distinct components. In some examples, at least some components of the communications manager 1105 are implemented at least in part as software stored in a memory. For example, portions of one or more of the components of the communications manager 1105 can be implemented as non-transitory code executable by the processor to perform the functions or operations of the respective component.

The receiver 1110 may receive one or more of reference signals (for example, periodically configured CSI-RSs, aperiodically configured CSI-RSs, or multi-beam-specific reference signals), synchronization signals (for example, SSBs), control information and data information, such as in the form of packets, from one or more other wireless communication devices via various channels including control channels (for example, a PDCCH) and data channels (for example, a PDSCH). The other wireless communication devices may include, but are not limited to, a base station 110 described with reference to FIG. 1.

The received information may be passed on to other components of the device 1100. The receiver 1110 may be an example of aspects of the receive processor 258 described with reference to FIG. 2. The receiver 1110 may include a set of radio frequency (RF) chains that are coupled with or otherwise utilize a set of antennas (for example, the set of antennas may be an example of aspects of the antennas 252*a* through 252*r* described with reference to FIG. 2).

The transmitter 1120 may transmit signals generated by the communications manager 1105 or other components of the wireless communication device 1100. In some examples, the transmitter 1120 may be collocated with the receiver 1110 in a transceiver. The transmitter 1120 may be an example of aspects of the transmit processor 254 described with reference to FIG. 2. The transmitter 1120 may be coupled with or otherwise utilize a set of antennas (for example, the set of antennas may be an example of aspects of the antennas 252*a* through 252*r* described with reference to FIG. 2), which may be antenna elements shared with the receiver 1110. In some examples, the transmitter 1120 is configured to transmit control information in a PUCCH and data in a PUSCH.

The communications manager 1105 may be an example of aspects of the controller/processor 280 described with reference to FIG. 2. The communications manager 1105 may include the uplink transmission power component 1130, the pathloss component 1140, and the range monitoring component 1150. In one implementation, that transmitter 1120 may transmit an uplink message. Additionally, in this implementation, working in conjunction with the transmitter 1120, uplink transmission power component 1130 may determine an uplink transmission power for transmitting the uplink message. Additionally, working in conjunction with the receiver 1010, the pathloss component 1140 may receive a measurement report indicating an RSSI of the uplink message. The RSSI of the uplink message may be measured at a victim UE. Additionally, the pathloss component 1140 may determine a pathloss associated with the aggressor UE based on one or more CLI measurements and the uplink transmission power. Furthermore, in this implementation, the range monitoring component 1150 may determine a range between a location of the device 1100 and the victim UE based on the pathloss.

Figure 12:
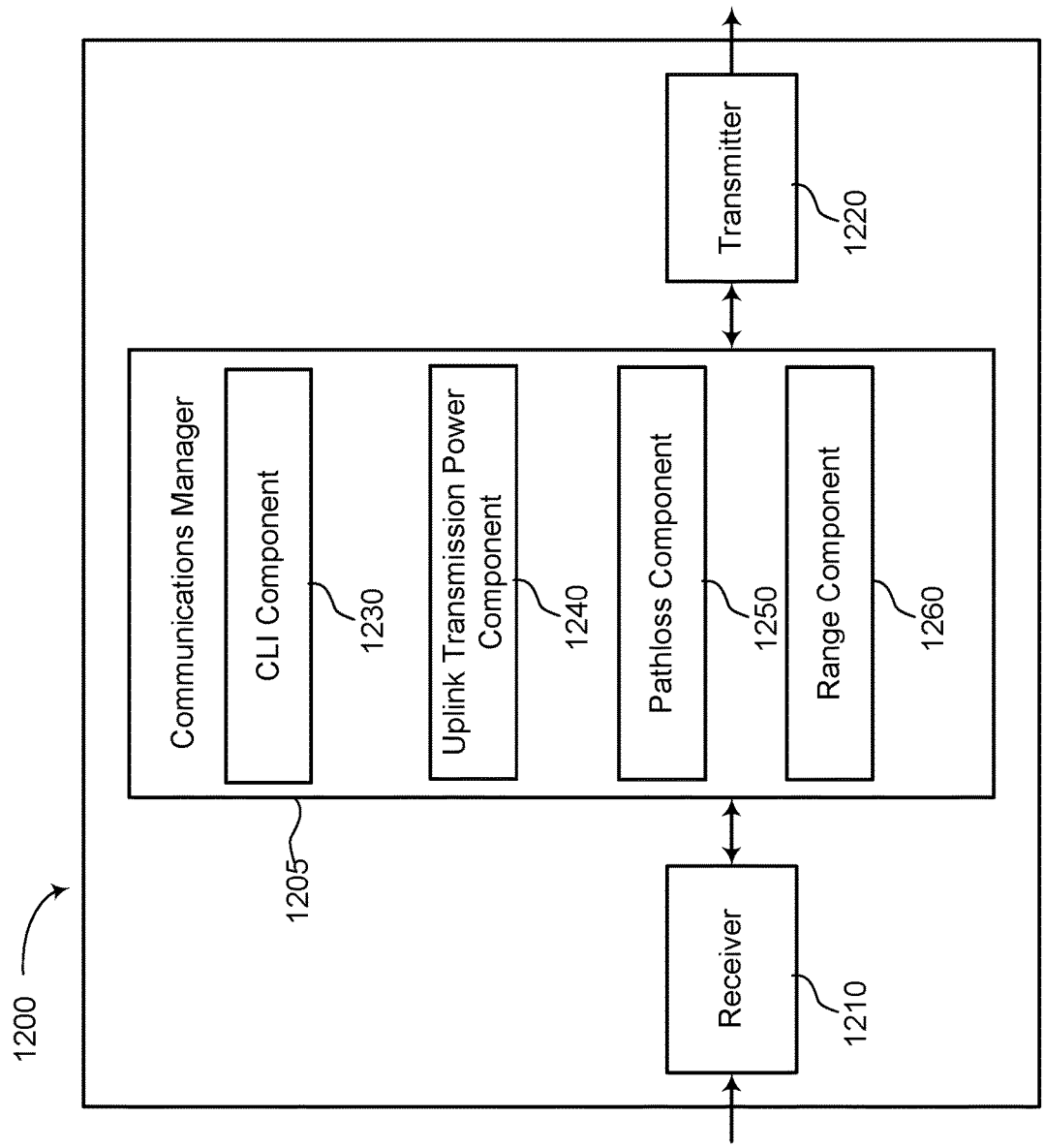
FIG. 12 is a block diagram illustrating an example of a wireless communication device that supports RSSI based positioning, in accordance with aspects of the present disclosure.

FIG. 12 is a block diagram illustrating an example of a wireless communication device 1200 that supports CLI RSSI based positioning, in accordance with aspects of the present disclosure. The device 1200 may be an example of aspects of a base station, such as a base station 110 described with reference to FIG. 1. The device 1200 may implement an architecture for supporting downlink grant transmissions for initiating channel measurements for a downlink channel associated with a multicast transmission. The wireless communication device 1200 may include a receiver 1210, a communications manager 1215, a transmitter 1220, a CLI component 1230, an uplink transmission power component 1240, a pathloss component 1250, and a range component 1260, which may be in communication with one another (for example, via one or more buses). In some examples, the wireless communication device 1200 is configured to perform operations, including operations of the process 1500 described below with reference to FIG. 15.

In some examples, the wireless communication device 1200 can include a chip, chipset, package, or device that includes at least one processor and at least one modem (for example, a 5G modem or other cellular modem). In some examples, the communications manager 1215, or its subcomponents, may be separate and distinct components. In some examples, at least some components of the communications manager 1215 are implemented at least in part as software stored in a memory. For example, portions of one or more of the components of the communications manager 1215 can be implemented as non-transitory code executable by the processor to perform the functions or operations of the respective component.

The receiver 1210 may receive one or more of signals, control information and data information, such as in the form of packets, from one or more other wireless communication devices via various channels, including control channels (for example, a PUCCH) and data channels (for example, a physical uplink shared channel (PUSCH)). The other wireless communication devices may include, but are not limited to, a UE 120 as described with reference to FIG. 1. In aspects of the present disclosure, the wireless communication device 1200 may forward and receive information via a backhaul connection.

The device 1200 may pass received information to other components of the device 1200. The receiver 1210 may be an example of aspects of the receive processor 238 described with reference to FIG. 2. The receiver 1210 may include a set of RF chains that are coupled with or otherwise utilize a set of antennas (for example, the set of antennas may be an example of aspects of the antennas 234a through 234t described with reference to FIG. 2).

The transmitter 1220 may transmit signals generated by the communications manager 1215 or other components of the wireless communication device 1200. In some examples, the transmitter 1220 may be collocated with the receiver 1210 in a transceiver. The transmitter 1220 may be an example of aspects of the transmit processor 220 described with reference to FIG. 2. The transmitter 1220 may be coupled with or otherwise utilize a set of antennas (for example, the set of antennas may be an example of aspects of the antennas 234a through 234t described with reference to FIG. 2), which may be antenna elements shared with the receiver 1210. In some examples, the transmitter 1220 is configured to transmit control information in a PDCCH and data in a PDSCH.

The communications manager 1215 may be an example of aspects of the controller/processor 240 described with reference to FIG. 2. The communications manager 1215 may include the CLI component 1230, the uplink transmission power component 1240, the pathloss component 1250, and the range component 1260. In one implementation, the CLI component 1230, working in conjunction with the transmitter 1220, the CLI component 1230 transmits a CLI configuration to a victim UE. The CLI configuration may indicate CLI resources for measurement. For example, the resources may include a resource block and a symbol of the uplink transmission from a neighboring UE, such as an aggressor UE. Additionally, working in conjunction with the receiver 1210, the CLI component 1230 may receive, from the victim UE, a CLI measurement indicating a CLI measurement based on transmitting the CLI configuration. In this implementation, working in conjunction with the transmitter 1220, the uplink transmission power component 1240 may transmit an uplink transmission power report configuration. In some examples, the uplink transmission power report configuration identifies resources for measuring an uplink transmission power. The resource indicated in the uplink transmission power report configuration may be the same as the resource indicated in the CLI configuration. In this implementation, working in conjunction with the receiver 1210, the uplink transmission power component 1240 may receive an uplink transmission power report indicating an uplink transmission power of the aggressor UE. Additionally, the pathloss component 1250 may determine a pathloss associated with the second UE based on the CLI measurement and the uplink transmission power. Furthermore, the range component 1260 may determine a range between the victim UE and the aggressor UE based on the pathloss.

Figure 13:
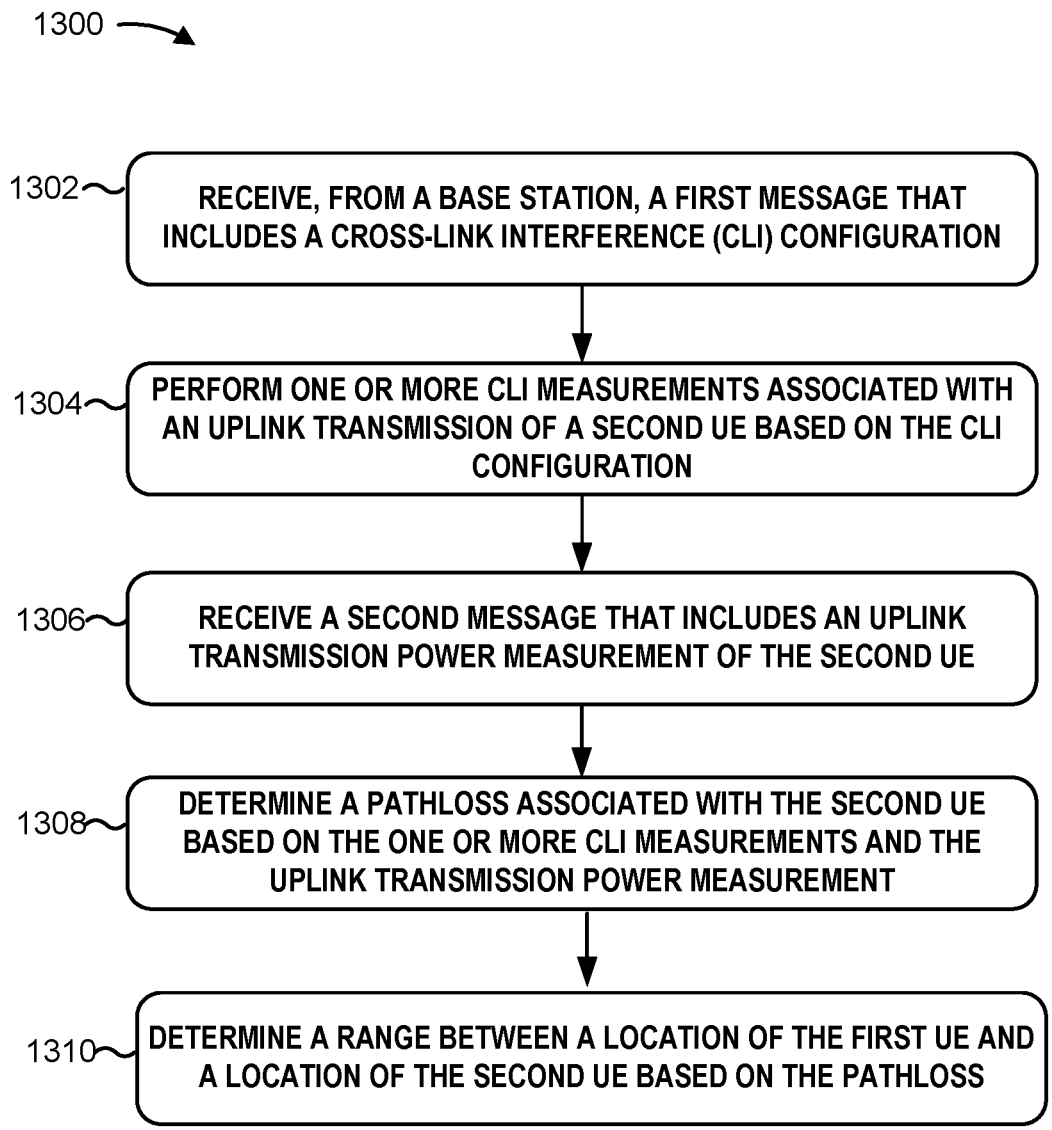
FIG. 13 is a diagram illustrating an example process performed at a UE that supports RSSI based positioning, in accordance with various aspects of the present disclosure.

FIG. 13 is a diagram illustrating an example process performed at a UE that supports CLI RSSI based positioning, in accordance with various aspects of the present disclosure. The example process 1300 is an example of determining a range between a location of a victim UE and a location of an aggressor UE based on CLI RSSI measurements, in accordance with various aspects of the present disclosure. The operations of the process 1300 may be implemented by a UE, such as a UE 120, or its components, described with reference to FIG. 1. For example, operations of the process 1300 may be performed by one or more of the receiver 1010, the communications manager 1005, the transmitter 1020, the CLI measurement component 1030, the pathloss component 1040, and the range component 1050, as described with reference to FIG. 10. In some examples, a UE may execute a set of instructions to control the functional elements of the UE to perform the operations or functions described below. Additionally, or alternatively, a UE may perform aspects of the operations or functions described below using special-purpose hardware.

In block 1302, the UE may receive, from a base station, a first message that includes a cross-link interference (CLI) configuration. After receiving a CLI configuration message, in block 1304, the UE performs one or more CLI measurements associated with an uplink transmission of a second UE based on the CLI configuration.

In block 1306, the UE receives a second message that includes an uplink transmission power measurement of the second UE. In block 1308, the UE determines a pathloss associated with the second UE based on the one or more CLI measurements and the uplink transmission power measurement. Additionally, in block 1310, the UE determines a range between a location of the first UE and a location of the second UE based on the pathloss.

Figure 14:
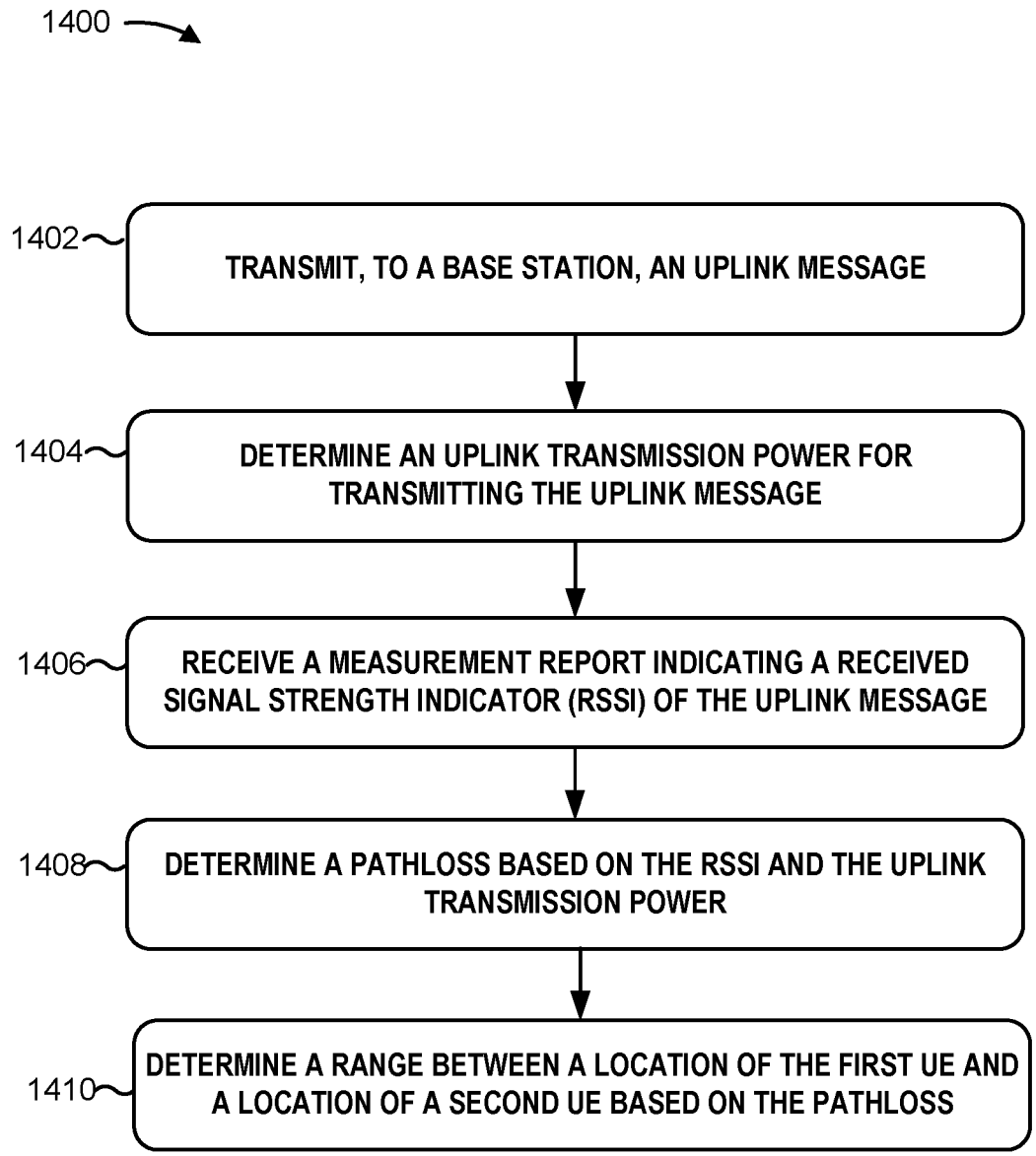
FIG. 14 is a diagram illustrating an example process performed at a UE that supports RSSI based positioning, in accordance with various aspects of the present disclosure.

FIG. 14 is a diagram illustrating an example process performed at a UE that supports CLI RSSI based positioning, in accordance with various aspects of the present disclosure. The example process 1400 is an example of determining a range between a location of a victim UE and a location of an aggressor UE based on CLI RSSI measurements, in accordance with various aspects of the present disclosure. The operations of the process 1400 may be implemented by a UE, such as a UE 120, or its components, described with reference to FIG. 1. For example, operations of the process 1400 may be performed by one or more of the receiver 1110, the communications manager 1105, the transmitter 1120, the uplink transmission power component 1130, the pathloss component 1140, and the range monitoring component 1150, as described with reference to FIG. 11. In some examples, a UE may execute a set of instructions to control the functional elements of the UE to perform the operations or functions described below. Additionally, or alternatively, a UE may perform aspects of the operations or functions described below using special-purpose hardware.

In block 1402, transmits, to a base station, an uplink message. After transmitting an uplink message to the base station, in block 1404, the UE determines an uplink transmission power for transmitting the uplink message. In block 1406, the UE receives a measurement report indicating a received signal strength indicator (RSSI) of the uplink message. In block 1408, the UE determines a pathloss based on the RSSI and the uplink transmission power. Additionally, in block 1410, the UE determines a pathloss based on the RSSI and the uplink transmission power.

Figure 15:
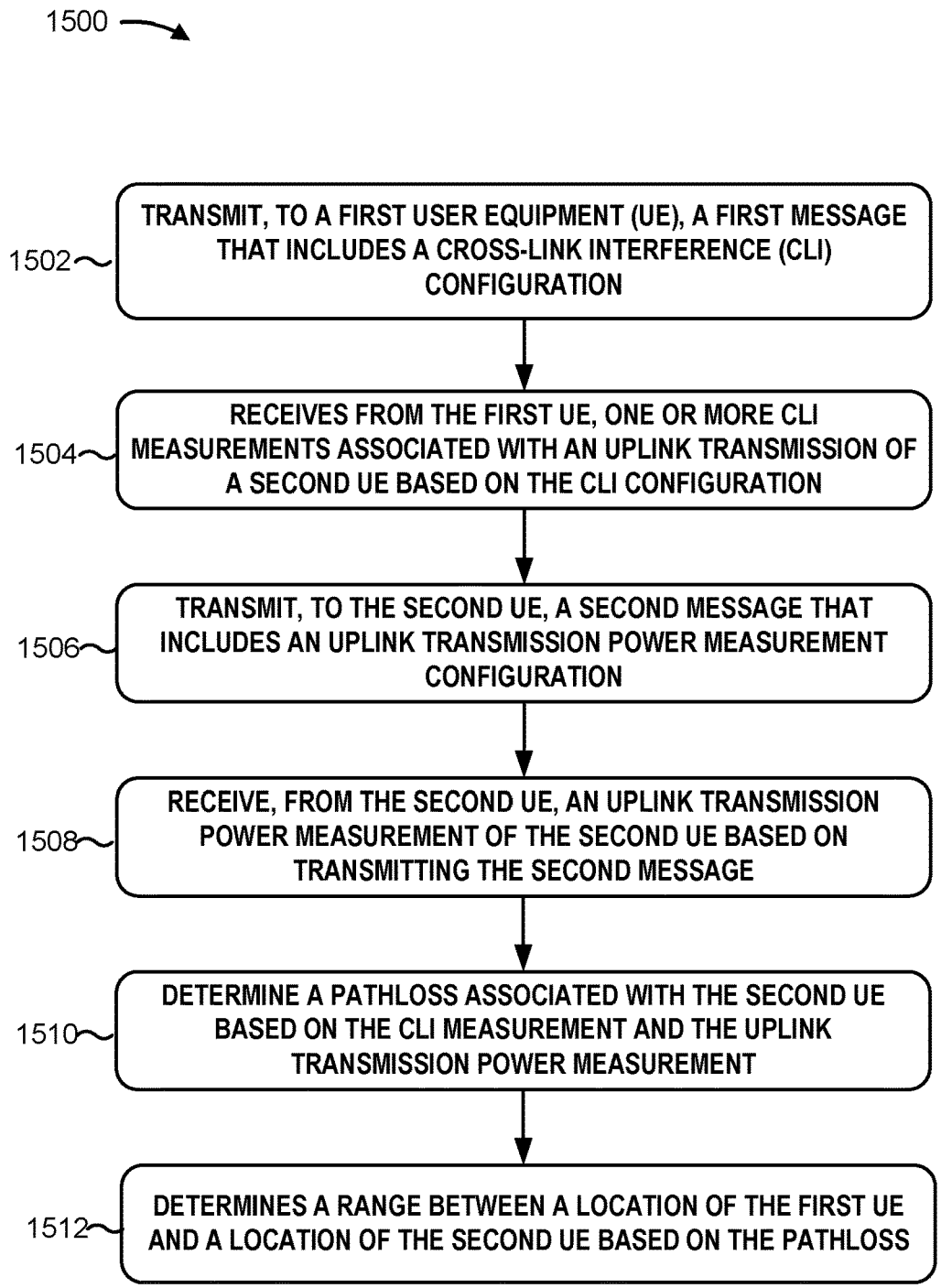
FIG. 15 is a diagram illustrating an example process performed at a UE that supports RSSI based positioning, in accordance with various aspects of the present disclosure.

FIG. 15 is a diagram illustrating an example process performed at a base station that supports CLI RSSI based positioning, in accordance with various aspects of the present disclosure. The example process 1500 is an example of determining a range between a location of a victim UE and a location of an aggressor UE based on CLI RSSI measurements, in accordance with various aspects of the present disclosure. The operations of the process 1500 may be implemented by a base station, such as a base station 110, or its components, described with reference to FIG. 1. For example, operations of the process 1500 may be performed by one or more of the receiver 1210, the communications manager 1215, the transmitter 1220, the CLI component 1230, the uplink transmission power component 1240, the pathloss component 1250, and the range component 1260, as described with reference to FIG. 10. In some examples, a UE may execute a set of instructions to control the functional elements of the UE to perform the operations or functions described below. Additionally, or alternatively, a UE may perform aspects of the operations or functions described below using special-purpose hardware.

In block 1502, the base station transmits, to a first UE, a first message that includes a cross-link interference (CLI) configuration. After the base station transmits a CLI configuration message, in block 1504, the base station receives, from the first UE, one or more CLI measurements associated with an uplink transmission of a second UE based on the CLI configuration.

In block 1506, the base station transmits, to the second UE, a second message that includes an uplink transmission power measurement configuration. In block 1508, the base station receives, from the second UE, an uplink transmission power measurement of the second UE based on transmitting the second message. In block 1510, the base station determines a pathloss associated with the second UE based on the CLI measurement and the uplink transmission power measurement. Additionally, in block 1512, the base station determines a range between a location of the first UE and a location of the second UE based on the pathloss.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method for wireless communication performed by a first user equipment (UE), comprising:
   receiving, from a base station, a first message comprising a cross-link interference (CLI) configuration;
   performing one or more CLI measurements associated with an uplink transmission of a second UE based on the CLI configuration;
   receiving a second message comprising an uplink transmission power measurement of the second UE;
   determining a pathloss associated with the second UE based on the one or more CLI measurements and the uplink transmission power measurement; and
   determining a range between a location of the first UE and a location of the second UE based on the pathloss.

2. The method of claim 1, wherein the one or more CLI measurements include a received signal strength indicator (RSSI).

3. The method of claim 1, wherein the first UE is configured for sidelink communication, and the second message is received from the second UE via a sidelink channel.

4. The method of claim 1, wherein the CLI configuration indicates a resource block and a symbol of the uplink transmission.

5. The method of claim 1, further comprising transmitting, to the base station, a CLI measurement report indicating the one or more CLI measurements, wherein the second message is received from the base station in response to transmitting the CLI measurement report.

6. The method of claim 1, wherein the uplink transmission overlaps a downlink transmission to the first UE.

7. The method of claim 1, wherein the first UE is a new radio (NR) light UE.

8. The method of claim 1, wherein the uplink transmission is a control signal transmission on an uplink control channel or a data message transmission on an uplink shared channel.

9. An apparatus for wireless communications at a first user equipment (UE), comprising:
a processor; and
a memory coupled with the processor and storing instructions operable, when executed by the processor, to cause the apparatus to:
receive, from a base station, a first message comprising a cross-link interference (CLI) configuration;
perform one or more CLI measurements associated with an uplink transmission of a second UE based on the CLI configuration;
receive a second message comprising an uplink transmission power measurement of the second UE;
determine a pathloss associated with the second UE based on the one or more CLI measurements and the uplink transmission power measurement; and
determine a range between a location of the first UE and a location of the second UE based on the pathloss.

10. A method for wireless communication performed by a first user equipment (UE), comprising:
transmitting, to a base station, an uplink message;
determining an uplink transmission power for transmitting the uplink message;
receiving a measurement report indicating a received signal strength indicator (RSSI) of the uplink message;
determining a pathloss based on the RSSI and the uplink transmission power; and
determining a range between a location of the first UE and a location of a second UE based on the pathloss.

11. The method of claim 10, wherein the first UE is configured for sidelink communication and the measurement report is received from the second UE via a sidelink channel.

12. The method of claim 10, wherein the measurement report is received from the base station based on transmitting the uplink message.

13. The method of claim 10, wherein the first UE is a new radio (NR) light UE.

14. The method of claim 10, wherein the uplink message is a control signal or a data message.

15. An apparatus for wireless communications at a first user equipment (UE), comprising:
a processor; and
a memory coupled with the processor and storing instructions operable, when executed by the processor, to cause the apparatus to:
transmit, to a base station, an uplink message;
determine an uplink transmission power for transmitting the uplink message;
receive a measurement report indicating a received signal strength indicator RSSI) of the uplink message;
determine a pathloss based on the RSSI and the uplink transmission power; and
determine a range between a location of the first UE and a location of a second UE based on the pathloss.

16. A method for wireless communication performed by a base station, comprising:
transmitting, to a first user equipment (UE), a first message comprising a cross-link interference (CLI) configuration;
receiving, from the first UE, one or more CLI measurements associated with an uplink transmission of a second UE based on the CLI configuration;
transmitting, to the second UE, a second message comprising an uplink transmission power measurement configuration;
receiving, from the second UE, an uplink transmission power measurement of the second UE based on transmitting the second message;
determining a pathloss associated with the second UE based on the CLI measurement and the uplink transmission power measurement; and
determining a range between a location of the first UE and a location of the second UE based on the pathloss.

17. The method of claim 16, wherein the CLI measurement is a received signal strength indicator (RSSI).

18. The method of claim 16, wherein:
the CLI configuration indicates a first resource block and a first symbol for measuring a first uplink transmission of the second UE;
the uplink transmission power measurement configuration indicates a second resource block and a second symbol for a second uplink transmission of the second UE;
the first resource block is the same as the second resource block; and
the first symbol is the same as the second symbol.

19. The method of claim 16, wherein the second message is transmitted via downlink control information (DCI), a media access control (MAC) message, a control element (CE), or radio resource configuration (RRC) signaling.

20. An apparatus for wireless communications at a base station, comprising:
a processor; and
a memory coupled with the processor and storing instructions operable, when executed by the processor, to cause the apparatus to:
transmit, to a first user equipment (UE), a first message comprising a cross-link interference (CLI) configuration;
receive, from the first UE, one or more CLI measurements associated with an uplink transmission of a second UE based on the CLI configuration;
transmit, to the second UE, a second message comprising an uplink transmission power measurement configuration;
receive, from the second UE, an uplink transmission power measurement of the second UE based on transmitting the second message;
determine a pathloss associated with the second UE based on the CLI measurement and the uplink transmission power measurement; and determine a range between a location of the first UE and a location of the second UE based on the pathloss.

\* \* \* \* \*